Dec. 14, 1943. M. H. JELLINEK 2,336,734
EXTRUSION OF SUBSTANTIALLY SURFACE-DRY, NON-PLASTIC MATERIAL
Filed Nov. 29, 1941
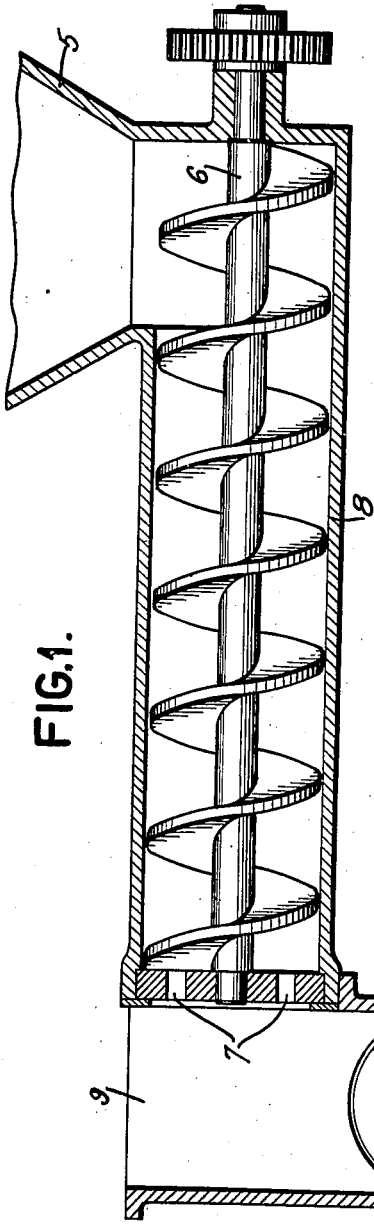
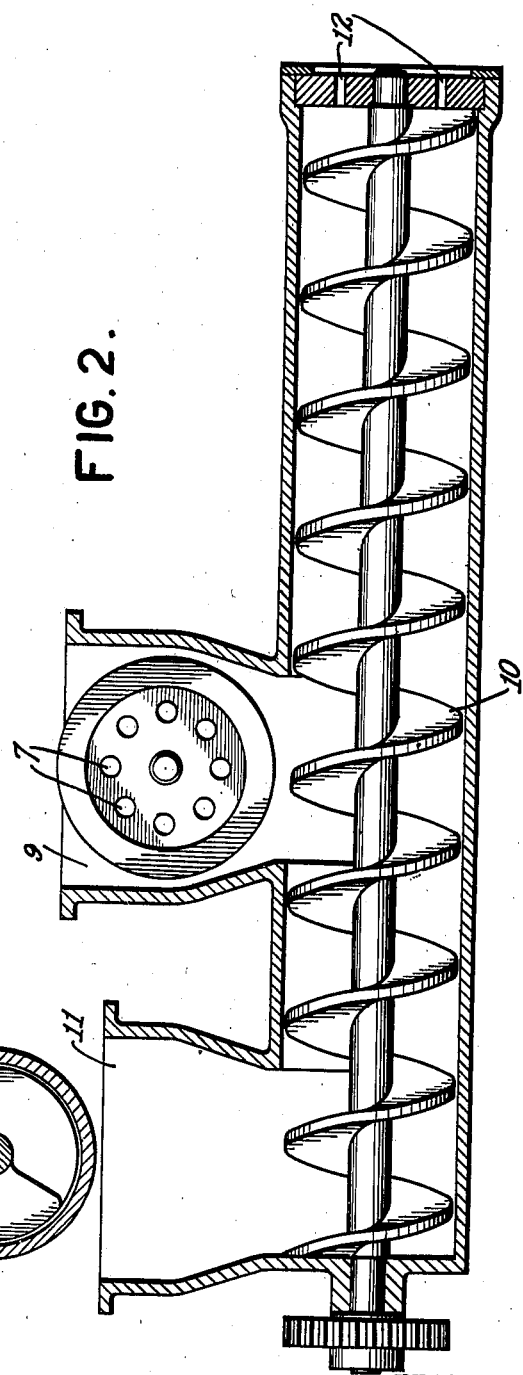
INVENTOR
MAURICE H. JELLINEK
BY
E. F. Liebrecht
ATTORNEY Patented Dec. 14, 1943

2,336,734

UNITED STATES PATENT OFFICE 2,336,734

EXTRUSION OF SUBSTANTIALLY SURFACE-DRY NONPLASTIC MATERIAL

Maurice H. Jellinek, Brooklyn, N. Y., assignor to The M. W. Kellogg Company, Jersey City, N. J., a corporation of Delaware Application November 29, 1941, Serial No. 421,025

3 Claims. (Cl. 25—156)

This invention relates to a process wherein solid material is forced under high pressure through an orifice or die for the purpose of imparting desired physical properties thereto. More particularly, the invention relates to an extrusion process of the latter type as applied to solid materials of a friable or pulverulent character which are substantially surface dry though containing appreciable amounts of absorbed liquid, and which, while initially lacking in plasticity, are capable of acquiring it upon being extruded, kneaded or otherwise worked. Solid materials having the latter characteristics are commonly obtained at an intermediate stage in the drying of substances which are substantially non-plastic in the dry condition, including clays, finely divided crystalline or amorphous precipitates, filter cakes, and the like. Superficially dry materials containing absorbed liquid often appear to exude moisture upon being worked vigorously.

The extrusion of a superficially dry material containing absorbed liquid may be desirable for many diverse reasons. In some cases the effects produced on the internal structure and individual particles of the material are important, while in others emphasis is placed upon the gross physical shape, size, density and strength imparted to the filaments, rods, or other forms in which the material issues from the extrusion die. By extruding through circular, square or other suitable dies and cutting the extruded material into short lengths, for example, a method of forming pellets is afforded. Extrusion through small dies tends to be a slow, power-consuming process, however, and one of the principal objects of my invention is to provide a method of extruding such solids whereby the power required to force a given quantity of material through a die is substantially reduced.

A further object of my invention is to provide a method of treating solids of the character described which are to be extruded whereby the rate of extrusion may be increased without the expenditure of additional power.

Still another object of my invention is to provide a method of decreasing the resistance of the solid material to extrusion.

In general terms, the feature of the invention which renders the foregoing objects possible of accomplishment consists of taking a quantity of superficially dry, solid material containing absorbed liquid which is to be extruded and subjecting all or a portion of it to a pre-working operation sufficient to impart plastic qualities thereto, combining any unworked material with the pre-worked portion and proceeding with the desired extrusion, substantially as hereinafter more fully described and claimed. I have found that by pre-plasticizing all or a portion of the feed to an extrusion operation, the hourly output of the extrusion machinery is increased, the power consumed per unit quantity of material extruded is decreased, and the wear and tear on the extrusion machinery is reduced. It might at first appear that any reduction in the power consumption of the extrusion operation would, on account of the additional power consumed in the pre-working operation, not constitute any real saving. As will be hereinafter more fully explained, however, the expenditure of a minor amount of power in the pre-working step of my invention makes possible a much larger reduction in the power consumption of the final extrusion operation.

In accordance with the first and perhaps the simplest embodiment of my invention to be described herein, I subject the whole of a quantity of material for extrusion to pre-working, and then proceed with the extrusion thereof. The pre-working step of my improved process may take many forms, and in general may be carried out in any type of machinery adapted to subject solid material to substantial pressure and/or shearing stress. I prefer, however, that the pre-working shall be itself accomplished by extrusion. The severity of the pre-working is then susceptible of relatively precise regulation simply by varying the size of the dies in the preliminary extrusion operation. For minimum power consumption the severity of the pre-working, or more specifically the smallness of the dies used in the preliminary extrusion, should be just sufficient to change the described material from its initial pulverulent or friable form into a coherent plastic form. The severity of pre-working necessary to accomplish this change depends upon the particular material treated, and with any given material it varies inversely with the moisture content thereof. It will be appreciated that the utility of the embodiment of the invention thus far discussed is greatest when the largest die capable of conferring plasticity upon the material is substantially larger in size than the die through which the material is to be passed in the final extrusion.

In accordance with a second embodiment of the invention, I take a quantity of the superficially dry, friable material containing absorbed liquid and subject a portion thereof comprising preferably from about 5 per cent to about fifty per cent of the whole quantity to a plasticizing pre-extrusion. I then re-combine the pre-extruded portion with the remaining untreated material and proceed with the final extrusion. I have discovered that the beneficial effect of partial pre-extrusion on the final extrusion is substantially greater, in proportion to the per cent pre-extruded, than would be predicted from the results obtained in pre-extrudig the whole of a quantity of the material. That is to say, by pre-extruding 50 per cent the power saving may be on the order of 75 per cent as great as with 100 per cent pre-extrusion, and by pre-extruding 20 per cent the power saving may be on the order of 50 per cent as great as with 100 per cent pre-extrusion.

While I do not wish to be limited by any theory advanced herein in explanation of the efficacy of my invention, it is believed that the pre-working of solids of the character described has the effect of forcing absorbed moisture to the surface, where it can act as a lubricant to ease the movement of the solids through the constricted passageways of an extrusion machine. The ability of a minor proportion of pre-worked material to provide lubrication for a major proportion of unworked material may be due to the tendency of the pre-worked material to cling to surfaces and to coat them with a lubricating film. This latter hypothesis is strengthened by the further fact, which I have discovered, that the beneficial effect of incorporating pre-worked material in the feed to a final extrusion operation persists for a time after the inclusion of pre-worked material in the feed has ceased, and even after ample time has elapsed for earlier-added material to clear the extrusion machinery. The possibility therefore exists of modifying the previously described second embodiment of my invention by substituting the intermittent feeding of wholly or partly pre-extruded material, between periods of feeding untreated material, in place of employing a continuous feed of partially pre-extruded material.

In accordance with a third embodiment of the invention, I commence a final extrusion operation feeding untreated superficially dry material containing absorbed moisture, and then as the extruded material begins to be produced I continuously or intermittently return a minor proportion thereof for incorporation in untreated material which is about to be fed to the final extrusion. It will be seen that this arrangement avoids the necessity of providing auxiliary extrusion equipment for the preparation of lubricant stock.

The lubricating effect of pre-worked plasticized material is most markedly exhibited when extrusion is carried out in a machine employing a driven helical screw to force material through a die, as in the ordinary household meat grinder. In such a machine there is friction between the material being extruded and the rotating screw, as well as with the walls of the screw housing and the edge of the die, so that greater opportunity for lubrication exists. I prefer to use the screw-type machines because they are capable of continuous operation, but the advantages of the invention are realized to a substantial degree with extruders of the piston type, operated by hydraulic or other direct-acting pressure.

It will be appreciated that the lubricating effect obtained by operating in accordance with the invention may be taken advantage of in numerous ways. For example, in the initial design of extrusion equipment, by providing for the use of the invention, smaller motors of lower power consumption can be used to drive the screw-type final extrusion machines. On the other hand, by treating in accordance with the invention the feed to existing extrusion machinery which is already provided with driving means of limited power, the extrusion rate may be substantially increased. In the event that neither of the latter advantages are desired, the invention will still afford a method of decreasing the wear and tear on extrusion machinery, and lengthen the useful life thereof.

In order to illustrate the invention and the advantages obtainable thereby, the following example is given. A partially dried filter cake, consisting of copper pyrophosphate precipitated on activated charcoal, was to be extruded and cut into pellets for eventual use as a hydrocarbon polymerization catalyst. The cake, although it contained about 42 per cent water, was substantially surface-dry, friable, and non-plastic. A blank extrusion run was first made for purposes of comparison, by passing the raw cake through a commercial screw-type extruder equipped with round dies three-eighths of an inch in diameter. Operating at a constant power input, the extrusion rate was found to be approximately 2.4 cubic feet per hour. The extruded material was quite plastic and had a consistency like that of beeswax.

In a test operation corresponding to the first embodiment of the invention described herein, a further quantity of the raw cake was given a pre-extrusion, sufficient to develop its plastic qualities, in an extrusion machine like that employed in the blank run but equipped with dies having a diameter of 1.25 inches. At the same power input, the extrusion rate was approximately 20 cubic feet per hour. The pre-extruded material was then fed to a final extrusion operation conducted exactly like the blank run, and an extrusion rate of approximately 4.0 cubic feet per hour was observed.

From these data it is readily calculable that if the power consumption of one machine with three-eighth inch dies is X horsepower, then five machines operating on untreated cake and using 5X horsepower would produce 5×2.4=12.0 cubic feet per hour of extruded material. Operating on the pre-extruded material with the same power input, 5X horsepower, the output would be 20 cubic feet per hour, which rate would require one additional machine of X horsepower for the pre-extrusion. In other words, by the use of the invention, the extrusion rate of the five machines can be increased from 12 to 20 cubic feet per hour, or 66⅔ per cent, by the expenditure of only 20 per cent more power.

In a second test run, corresponding to the second of the described embodiments of the invention, the incorporation of about 20 per cent of pre-extruded material in the feed to a three-eighth inch final extrusion machine increased the output from 2.4 cubic feet per hour (the blank run) to approximately 3.2 cubic feet per hour, an increase of 33⅓ per cent. Since the power consumption of the pre-extrusion was only one-fifth as large per unit volume extruded as the final extrusion, the 33⅓ per cent output increase was obtained by the expenditure of only about 20%/5=4% more power. Substantially the same results were obtained by using material which had passed through the final extrusion, in place of the specially pre-extruded material, in admixture with untreated material fed to the final extrusion.

The accompanying drawing is provided to illustrate one modification of the invention in which a portion of the superficially dry, friable material containing absorbed moisture is subjected to preliminary extrusion to plasticize it, and the plasticized material thus obtained is combined with the remainder of the supercially dry material for extrusion, the combined material then being subjected to the final desired extrusion treatment. In the drawing, which represents diagrammatically apparatus suitable for carrying out this modification of the invention, Figure 1 shows in cross section apparatus suitable for subjecting the material to the preliminary extrusion step in its relation to the apparatus for carrying out the final desired extrusion step, and Figure 2 shows in cross section the apparatus for carrying out the final desired extrusion step in relation to the outlet of the apparatus for preliminary extrusion.

The portion of the superficially dry, friable material which it is found necessary to subject to preliminary extrusion is charged to hopper 5 which discharges onto a rotating screw 6 which is operated in a manner to transfer the material in the direction of a plurality of extrusion dies 7 suitably mounted in the end of the casing 8 which encloses rotating screw 6. The diameter of extrusion dies 7 is regulated to impart to the material passing therethrough the desired plasticizing effect.

Dies 7 discharge into a hopper 9 through which the material extruded through dies 7 drops onto a second rotating screw 10. Rotating screw 10 also is connected with a hopper 11 into which the remainder of the superficially dry, friable material for extrusion is charged. Rotating screw 10 is operated in a manner to transfer material received from hoppers 11 and 9 in the direction of a plurality of dies 12 suitably mounted at the end of casing 13 which encloses rotating screw 10. As the rotating screw 10 carries forward material received from hopper 11 this material is mixed with pre-plasticized material emerging from dies 7. The admixture of the pre-plasticized material has the effect of providing lubrication for the extrusion of the resulting combined mass with the result that the power required to operate screws 6 and 10 is less than it would be to operate screw 10 alone if all the material to be extruded were charged directly to hopper 11 without the pre-extrusion step. The speeds of rotation of screws 6 and 10 are regulated to provide the proper mixture of preplasticized material and unplasticized material to effect the desired final extrusion with a minimum requirement of power. Dies 7 and 12 may be of the same diameter, but ordinarily dies 7 are larger in diameter than dies 12.

While I have described certain embodiments of the invention herein, it is to be understood that these are exemplary only, as it is possible to devise other modifications without departing from the spirit of the invention. My invention is limited only by the following claims.

I claim:

1. In the extrusion of substantially surface dry non-plastic material having an appreciable content of absorbed moisture, the method of decreasing resistance of said material to the desired extrusion which comprises subjecting said material to mechanical work to develop the latent plasticity thereof, mixing thus-plasticized material with a further amount of the initial surface dry non-plastic material and then proceeding with the desired extrusion.

2. A method as in claim 1 wherein said mechanical working and plasticizing is effected by extrusion.

3. In the extrusion of a substantially surface dry non-plastic material having an appreciable content of absorbed moisture and which is rendered plastic by said extrusion, the improvement which comprises combining with said material prior to extrusion a portion of the plasticized extruded product.

MAURICE H. JELLINEK.